(12) United States Patent
Kim et al.

(10) Patent No.: US 7,869,696 B1
(45) Date of Patent: Jan. 11, 2011

(54) METHOD FOR RECORDING RECORDED DIGITAL DATA STREAM AND FOR PROVIDING PRESENTATION MANAGING INFORMATION FOR THE RECORDED DIGITAL DATA STREAM

(75) Inventors: Byung-Jin Kim, Kyunggi-do (KR); Kang-Soo Seo, Kyunggi-do (KR); Jea-Yong Yoo, Seoul (KR); Kzwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 1422 days.

(21) Appl. No.: 09/635,850

(22) Filed: Aug. 11, 2000

(30) Foreign Application Priority Data

Aug. 12, 1999 (KR) .................................. 99-33202

(51) Int. Cl.
*H04N 5/91* (2006.01)
*H04N 5/935* (2006.01)

(52) U.S. Cl. .......................... 386/211; 386/94; 386/95; 386/96; 386/125; 386/126; 386/214; 386/283; 386/329

(58) Field of Classification Search ......... 386/109–112, 386/125–126, 45, 95, 98, 33, 96, 46, 83, 386/75, 92, 1; 348/423.1
See application file for complete search history.

(56) References Cited

U.S. PATENT DOCUMENTS

| | | | |
|---|---|---|---|
| 5,377,051 A | 12/1994 | Lane et al. | |
| 5,535,008 A | 7/1996 | Yamagishi et al. | |
| 5,719,982 A | 2/1998 | Kawamura et al. | |
| 5,801,781 A | 9/1998 | Hiroshima et al. | |
| 5,818,547 A | 10/1998 | Ozaki et al. | |
| 5,832,085 A | 11/1998 | Inoue et al. | |
| 5,835,493 A * | 11/1998 | Magee et al. | 370/395.62 |
| 5,850,501 A | 12/1998 | Yanagihara et al. | |
| 6,021,168 A | 2/2000 | Huh et al. | |
| 6,064,676 A * | 5/2000 | Slattery et al. | 370/412 |
| 6,088,357 A * | 7/2000 | Anderson et al. | 370/392 |
| 6,118,486 A | 9/2000 | Reitmeier | |
| 6,169,843 B1 | 1/2001 | Lenihan et al. | |
| 6,181,872 B1 | 1/2001 | Yamane et al. | |
| 6,211,800 B1 | 4/2001 | Yanagihara et al. | |
| 6,226,483 B1 * | 5/2001 | Kazakos et al. | 399/266 |
| 6,310,898 B1 * | 10/2001 | Schwartz | 370/537 |
| 6,366,731 B1 * | 4/2002 | Na et al. | 386/83 |
| 6,370,322 B2 * | 4/2002 | Horiguchi et al. | 386/95 |
| 6,373,856 B1 | 4/2002 | Higashida et al. | |
| 6,442,330 B2 * | 8/2002 | Yanagihara et al. | 386/75 |
| 6,460,097 B1 | 10/2002 | Harumoto et al. | |

(Continued)

FOREIGN PATENT DOCUMENTS

CN    1221284 A    6/1999

(Continued)

*Primary Examiner*—Jamie Atala
(74) *Attorney, Agent, or Firm*—Birch, Stewart, Kolasch & Birch, LLP

(57) ABSTRACT

A method and apparatus for providing presentation managing information for the recording medium, are provided. The method includes generating a transport stream, comprising reproducing, from a recording medium, an MPEG transport stream composed of a series of transport packets carrying data; and selectively inserting, into the reproduced MPEG transport stream, program managing information for managing presentation of certain data carried in the reproduced MPEG transport stream.

19 Claims, 7 Drawing Sheets

U.S. PATENT DOCUMENTS

| | | |
|---|---|---|
| 6,467,093 B1 | 10/2002 | Inoue et al. |
| 6,477,185 B1 * | 11/2002 | Komi et al. ................. 370/536 |
| 6,504,996 B1 * | 1/2003 | Na et al. ..................... 386/125 |
| 6,542,518 B1 * | 4/2003 | Miyazawa ................. 370/468 |
| 6,567,409 B1 | 5/2003 | Tozaki et al. |
| 6,580,869 B1 | 6/2003 | Ando et al. |
| 6,618,549 B1 | 9/2003 | Kato et al. |
| 6,741,795 B1 * | 5/2004 | Takehiko et al. .............. 386/95 |
| 6,754,273 B1 | 6/2004 | Sackstein et al. |
| 6,782,189 B2 | 8/2004 | Ando et al. |
| 6,792,198 B1 | 9/2004 | Kim et al. |
| 6,865,747 B1 | 3/2005 | Mercier |
| 6,901,078 B2 | 5/2005 | Morris et al. |
| 7,088,911 B2 | 8/2006 | Himeno et al. |
| 2002/0118953 A1 | 8/2002 | Kim |
| 2003/0189879 A1 | 10/2003 | Ishii et al. |
| 2004/0081435 A1 | 4/2004 | Maehashi et al. |

FOREIGN PATENT DOCUMENTS

| | | |
|---|---|---|
| EP | 0 863 669 A1 | 9/1998 |
| EP | 0 869 669 A2 | 10/1998 |
| EP | 0 917 355 A1 | 5/1999 |
| JP | 06-178288 | 6/1994 |
| JP | 08-140043 | 5/1996 |
| JP | 11-045512 | 2/1999 |
| JP | 11-261963 A | 9/1999 |
| KR | 1999-045329 A | 6/1999 |
| KR | 10-0252108 B1 | 1/2000 |
| KR | 10-2000-0026049 A | 5/2000 |
| KR | 1998-040115 | 3/2005 |
| WO | WO-00/30358 A1 | 5/2000 |
| WO | WO-01/20826 | 3/2001 |

* cited by examiner

*Conventional Art*

METHOD FOR RECORDING RECORDED DIGITAL DATA STREAM AND FOR PROVIDING PRESENTATION MANAGING INFORMATION FOR THE RECORDED DIGITAL DATA STREAM

BACKGROUND OF THE INVENTION

1. Field of the Invention

The present invention relates to a method and apparatus for providing presentation managing information which is required for a digital television to present received a program variously and immediately when reproducing a digital data stream recorded on a disk recording medium such as a high density digital versatile disk (referred as 'HDVD' hereinafter).

2. Description of the Related Art

FIG. 1 is block diagrams of a DVD player and a digital television which are connected each other through a digital interface such as IEEE 1394 standard.

The DVD player 100 comprises an optical pickup 2 for detecting data recorded on a DVD 1; a demodulator 3 for demodulating and error-correcting the detected data; a scrambler 4 (or a copy protecting device) for scrambling data outputted from the demodulator 3 with copy protecting codes; a path selector 5 for selecting one or two output paths for data scrambled with the copy protecting codes; a data parser 6 for parsing the data stream whose type is program stream (PS) and received through the path selector 5, into presentation and navigation data and then parsing the presentation data into audio, video and sub-picture data again; decoders 7 and 8 for decoding the parsed audio and video data into uncompressed data respectively; a presentation engine 9 for combining the decoded audio and video data into a digital audio signal and a digital video signal; D/A converters 10 and 11 for converting the digital audio and video data into corresponding analog signals respectively; a microcomputer 12 for controlling the reproduction operation for the optical disk 1 depending upon the navigation data from the data parser 6 and a key command from a user; a memory 15 storing data necessary for the control operation of the microcomputer 12; a PS/TS converter 13 for converting the PS outputted from the path selector 5 into a transport stream (TS); and an interface 14 for transmitting the converted TS through a IEEE 1394 digital communication line.

The digital TV 200 comprises an interface 21 for receiving the TS from the DVD player 100 through the IEEE 1394 digital communication line; a deMUX 23 for demuxing the received TS into audio and video data; decoders 24 and 25 for decoding the audio and video data into uncompressed audio and video data respectively; D/A converters 26 and 27 for converting the uncompressed digital data into corresponding analog audio and video signals respectively; a microcomputer 22 for generating control signals for each element corresponding to a user's key input; an on-screen displaying (OSD) circuitry 28 for outputting character signals corresponding to an advisory message provided by the microcomputer 22 onto a screen; a mixer 30 for mixing the character signals with the video signals; and a memory 29 storing data necessary for the control operation of the microcomputer 22.

A key entering means 50 such as a remote controller for controlling the operations of the DVD player 100 and/or the D-TV 200 is also shown in FIG. 1.

In the DVD player 100 configured as FIG. 1, recorded signals detected from the DVD 1 by the optical pickup 2 are demodulated into PS by the demodulator 3. The PS is separated into audio, video and sub-picture data of MPEG format by the data parser 6, and the MPEG-formatted data are converted into audio and video signals by the decoders 7, 8, and 9, the presentation engine 10, and the D/A converters 11 and 12. Also, the PS is sent to the PS/TS converter 13 through the path selector 5. The PS/TS converter 13 decodes the PS and interprets the stream identification number, sorts out the PS into program specific information (PSI) for controlling program presentation, presentation data containing audio and video data, and system clock data.

The PSI and system clock data are used as information for controlling presentation of program and system clock synchronization, respectively.

The presentation data are converted into TS whose format is acceptable to the digital TV 200 and transferred to the digital TV 200 through the IEEE 1394 interfaces 14 and 21. Accordingly, the digital TV 200 can present high-quality digital video and audio to a viewer after decoding the received TS.

A difference between aforementioned PS and TS is as follows.

The PS is composed of several packs and each pack has packetized elementary stream (PES) packets containing digitized video, audio, and additional information data. A PES packet can contain data whose size is variable so that the size of a PES packet may not be same all the time.

On the contrary, the TS is composed of transport packets (TPs) and each packet has a fixed length of 188 bytes including its packet header.

Accordingly, when converting a PS into a TS, each PES packet of PS should be divided into packets of TS sequentially and necessary header information is added to each divided transport packet (TP) at that time. Because a PES packet is divided into multiple TPs, the remaining area of the last TP is stuffed with null data after writing all data of a PES packet in the multiple TPs.

However, a recently-developed HDVD player has adopted the TS format as the recording-type of data stream for a HDVD so that a data stream reproduced from a HDVD can be directly signal-processed in a digital television in consideration that a HDVD player is connected with a digital television. Therefore no TS/PS conversion will be required in transmitting the reproduced digital data stream to the digital television. However, the digital television receiving the transport stream needs presentation managing information such as program specific information (PSI) for various and stable video and audio presentation. It is standard that the PSI is periodically or intermittently inserted in the digital broadcast signal.

Accordingly, the method for recording presentation managing information such as the PSI repeatedly on a HDVD may be considered. However, if the presentation managing information is repeatedly recorded on a HDVD, the space for program data on the disc is remarkably decreased.

SUMMARY OF THE INVENTION

Accordingly, it is an object of the present invention to provide a method and apparatus for providing management information, which overcome the limitations associated with the related art.

It is another object of the present invention to provide a method and apparatus for constructing presentation managing information such as PSI based on the management information of digital data stream reproduced a high-density disk-type recording medium such as HDVD, inserting the constructed presentation managing information in packetized format into the reproduced data stream intermittently or periodically, and then transmitting the data stream containing the packetized presentation managing information to a digital television, thereby eliminating the necessity of repeated recording of the presentation managing information such as the program specific information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
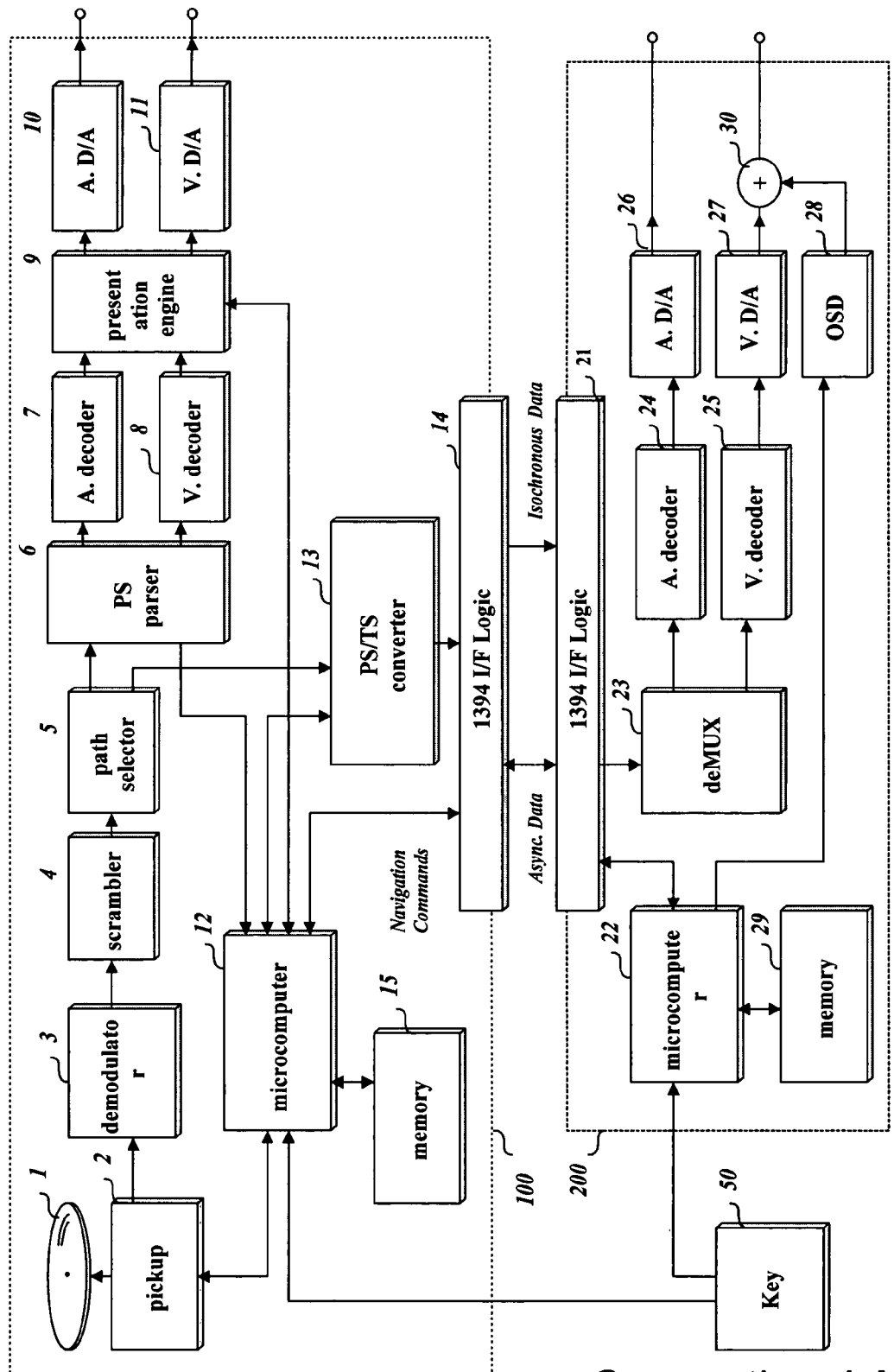
FIG. 1 is a block diagram of a general DVD player and a digital television.
Figure 2:
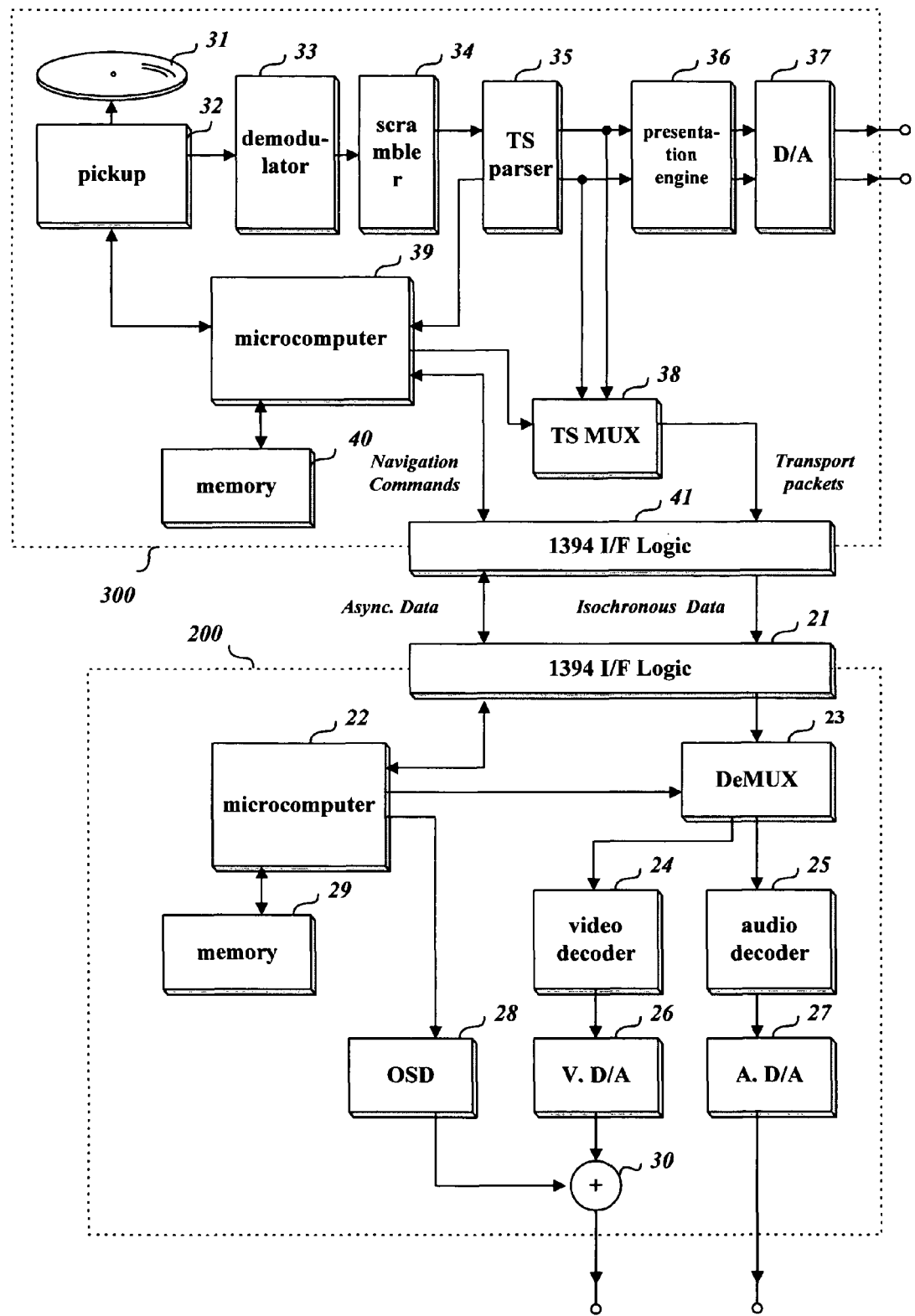
FIG. 2 is a block diagram of a DVD player and a digital television to which a method for recording digital data stream and providing presentation managing information therefor according to the present invention is applied according to an embodiment of the present invention.

FIG. 2 is a block diagram of a HDVD player and a digital television to which a method for recording digital data stream and providing presentation managing information therefor according to the present invention is applied.

The HDVD player 300 of FIG. 2 comprises an optical pickup 32 for detecting data recorded on a HDVD 31; a demodulator 33 for demodulating and error-correcting the detected data; a scrambler 34 (or a copy protecting device) for scrambling data outputted from the demodulator 33 with copy protecting codes; a data parser 35 for parsing the data stream (whose type is TS) scrambled with the copy protecting codes into presentation and navigation data and then parsing the presentation data into audio and video data; a presentation engine 36 for decoding the parsed audio and video data into uncompressed data respectively, and converting the decoded audio and video data into digitized real audio and video data; D/A converter 37 for converting the digitized audio and video data into corresponding analog and video signals respectively; a microcomputer 39 for generating packetized presentation managing information, for example PSI to be used for adequate and immediate program presentation, and controlling reproduction operation for the HDVD 31 based on the navigation data from the data parser 35 and a key command from a user; a memory 40 storing data necessary for the control operation of the microcomputer 39; a TS MUX 38 for reformatting the video and audio data from the parser 35 into TS packets and multiplexing the reformatted packets and the packetized program managing information from the microcomputer 39; and an interface 41 for transmitting the multiplexed transport packets through a IEEE 1394 digital communication line.

The digital TV 200 of FIG. 2 comprises an interface 21 for receiving TS from the DVD player 300 through the IEEE 1394 digital communication line; a deMUX 23 for demuxing the received TS into audio and video data; decoders 25 and 24 for decoding the audio and video data into uncompressed audio and video data respectively; D/A converters 27 and 26 for converting the uncompressed digital data into corresponding analog audio and video signals respectively; a microcomputer 22 for generating control signals for each element corresponding to a user's key input; an on-screen displaying (OSD) circuitry 28 for outputting character signals corresponding to an advisory message provided by the microcomputer 22 onto a screen; a mixer 30 for mixing the character signals with the video signals; and a memory 29 storing data necessary for control operation of the microcomputer 22.

The method for recording digital data stream and providing presentation managing information for digital data stream according to the present invention will now be described in detail.

Figure 3:
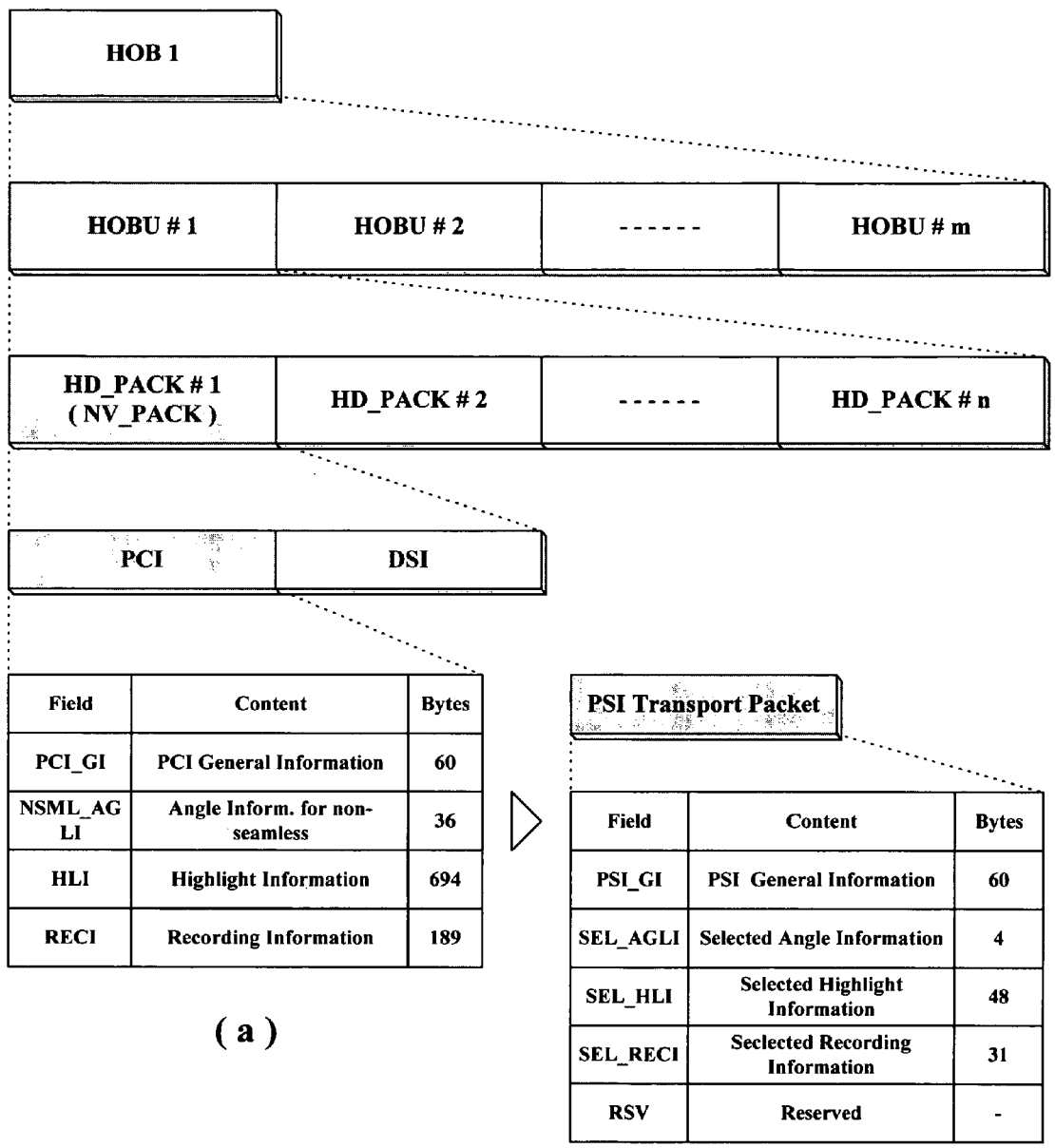
FIG. 3 shows an example of a layer structure and data syntax of the presentation control information (PCI) according to the present invention.

FIG. 3 shows a recording syntax for TS-formatted data of a HDVD according to the present invention. As shown in FIG. 3, one or more high-density-recorded stream objects (HOB) are recorded on a HDVD. A single HOB is corresponding to a single title or program and is composed of many high-density-recorded stream object units (HOBUs). A single HOBU is composed of the first pack of navigation data and the remaining packs, which are corresponding to the GOP layer of the MPEG standard, of video and audio data. The navigation pack contains program control information (PCI) and data search information (DSI) and the first pack among the presentation data packs is always the start pack of data of a Infra-coded picture (I-picture).

In the PCI recorded in the first pack, PCI general information and information on angle, highlight, recording parameters, whose format is given in (a) of FIG. 3, are recorded for controlling various presentation of data stream reproduced from a HDVD. Therefore, the microcomputer 39 extracts the PCI, that is, the PCI general information and information of angle, highlight and recording parameters and constructs the extracted information into TP-formatted PSI which is interpretable in the digital television 200. The constructed PSI packet includes internal fields described in (b) of FIG. 3.

Other attribute fields not described in (b) of FIG. 3 may be inserted in the PSI packet or may replace the described fields of the PSI packet depending upon the data stream to be transmitted to the digital television.

Figure 4:
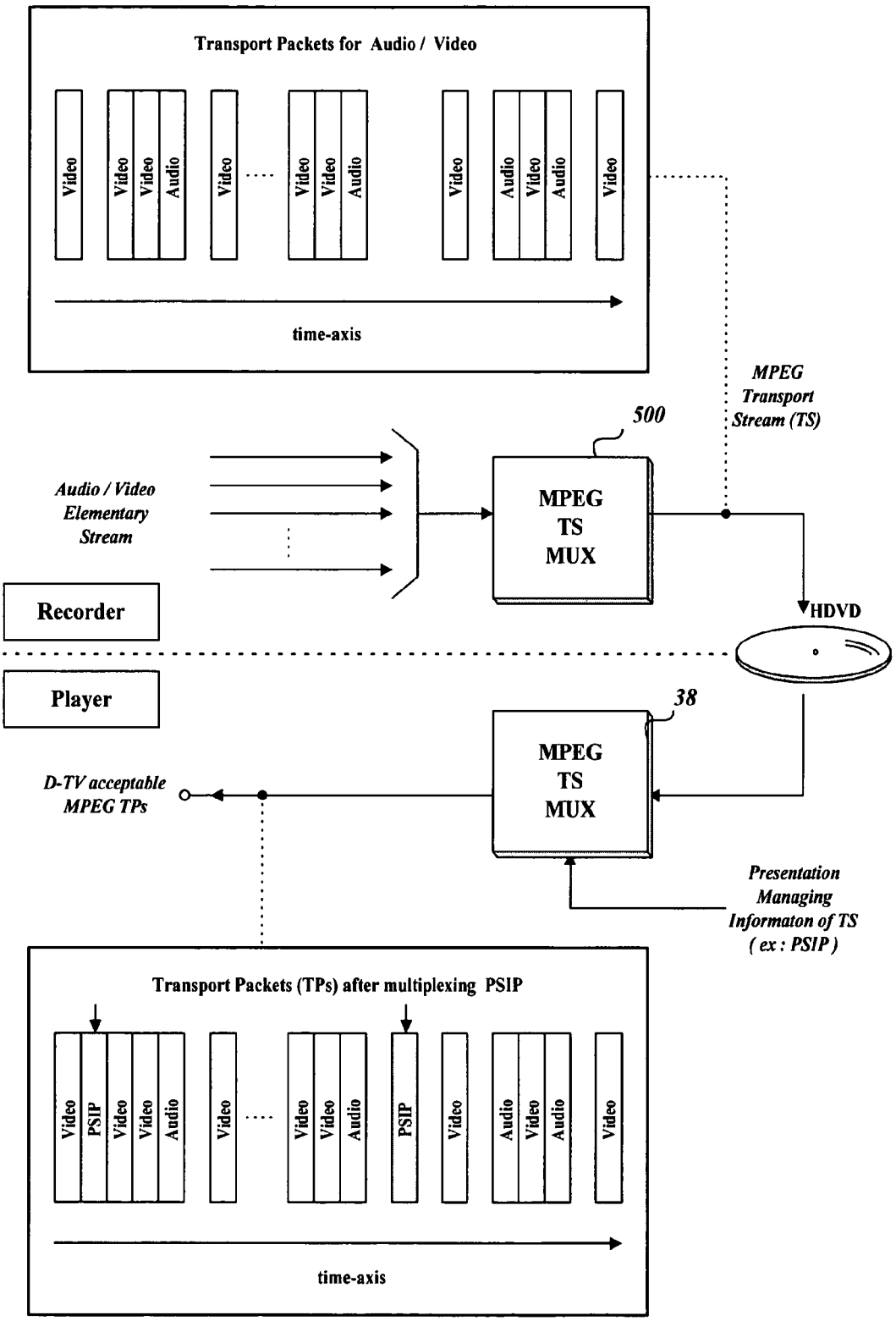
FIG. 4 is a first embodiment of a presentation managing information providing method according to the present invention.

FIG. 4 is the first embodiment of a presentation managing information providing method according to the present invention. When a TS for audio and video data of a title or a program is recorded by a TS MUX 500 equipped in the HDVD manufacturing apparatus as shown in FIG. 4 to manufacture a HDVD-ROM, there may be time interval in which audio and video data packets will not be delivered to a presentation apparatus such a digital television. Therefore, the microcomputer 39 of the HDVD player 300 detects the interval while reproducing the recorded program or title of a HDVD 31, then outputs the PSI packet produced by the aforementioned method to the TS MUX 38 during the detected interval after deciding on whether the PSI packet should be delivered at this interval, thereby inserting the packetized presentation managing information such as the PSI between the transport packets containing video and audio data without delaying any data packet in transferring to the digital television 200.

To be brief, the microcomputer 39 decides whether to send the PSI packet at the time when the null interval is detected, produces the PSI packet and inserts it into the null interval based on the decision. Therefore, the digital television 200 receives intermittently PSI for the reproduced data stream so that it uses PSI to present video and audio in various format and/or as immediately as possible when channel is switched.

Figure 5:
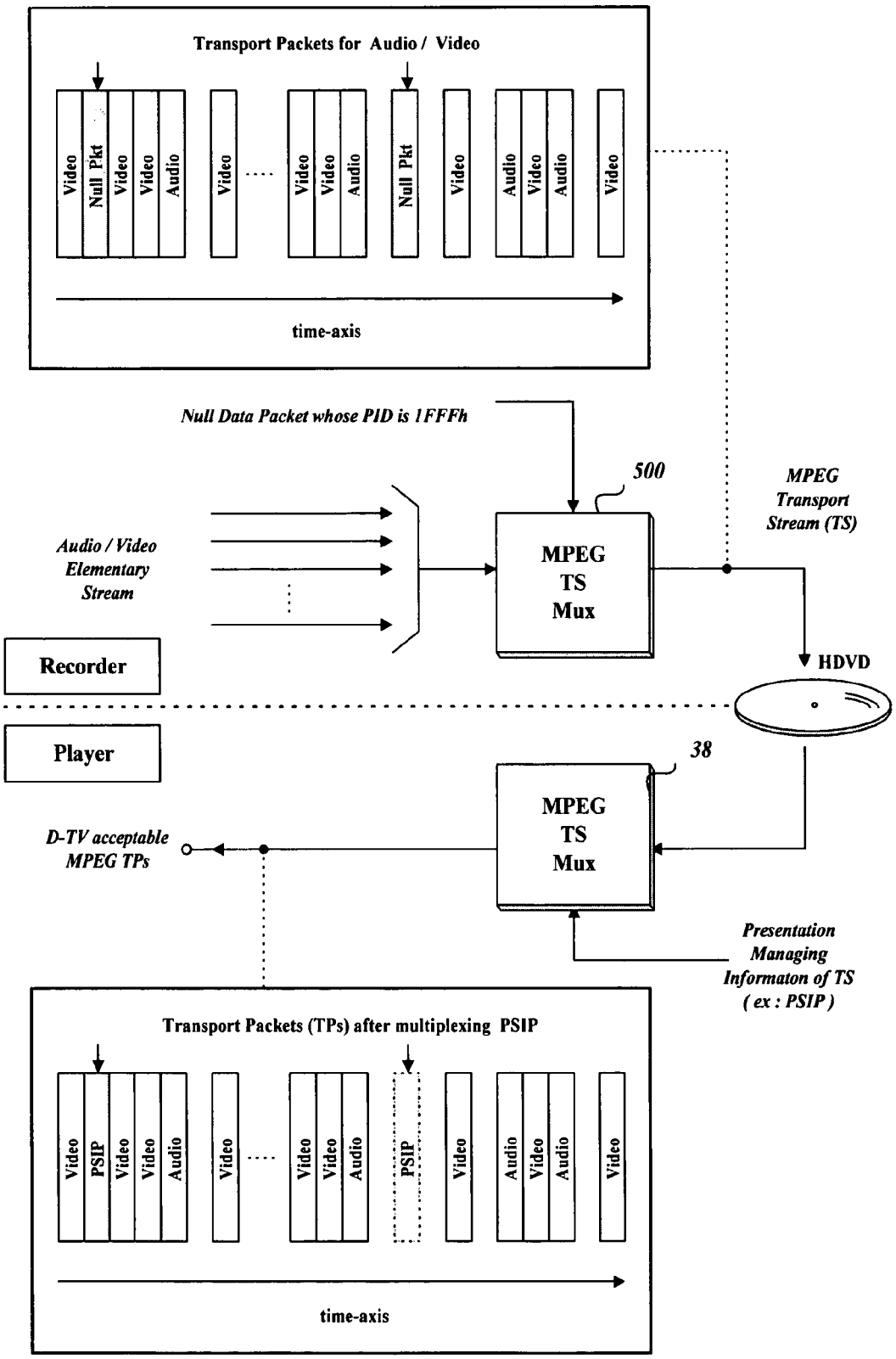
FIG. 5 is a second embodiment of a presentation managing information providing method according to the present invention.

FIG. 5 is the second embodiment of a presentation managing information providing method according to the present invention. When a TS for audio and video of a title or a program is recorded by a TS MUX 500 equipped in the HDVD manufacturing apparatus as shown in FIG. 5 to manufacture a HDVD-ROM, if there is time interval in which audio and video data packets will not be delivered to a presentation apparatus and the time interval is likely to be used as a time slot for a PSI packet to be sent, a null data packet, whose packet ID, for example 1FFFh is different from those of video and audio packets, is inserted for the time interval to be recorded between data packets. Therefore, the microcomputer 39 of the HDVD player 300 detects the null data packet while reproducing the recorded program or title, then replaces the detected null packet with the PSI packet produced by the aforementioned method and applies the PSI packet to the TS MUX 38 instead of the detected null data packet, thereby providing the packetized presentation managing information such as the PSI between the TS packets containing video and audio without affecting the data packet delivering time.

To be brief, the microcomputer 39 produces the PSI packet and replaces the null data packet with it whenever the null data packet is detected or several null data packets are detected successively. Therefore, the digital television 200 receives intermittently PSI for the reproduced data stream so that it uses PSI to control presentation of video and audio.

Figure 6:
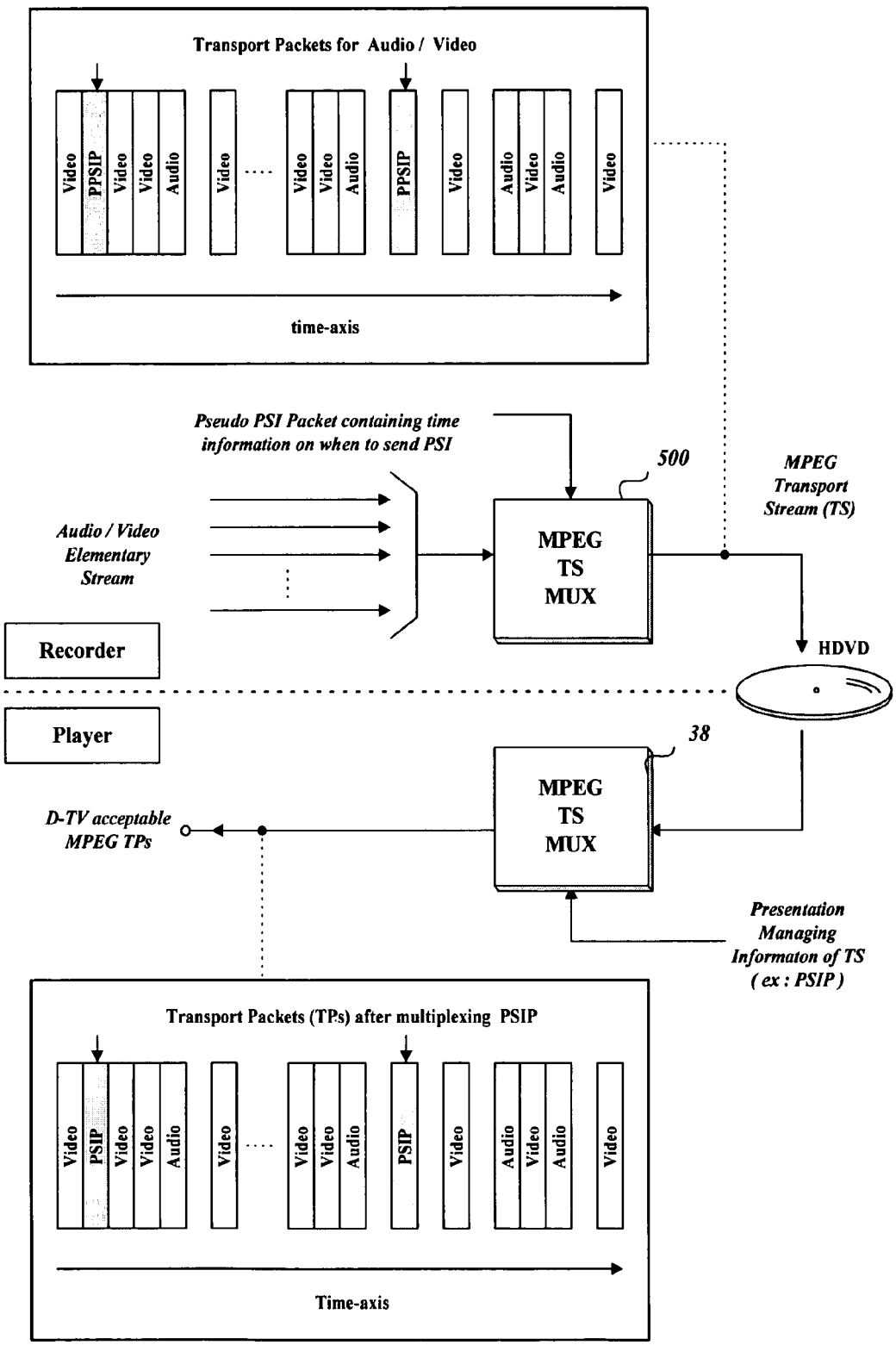
FIG. 6 is a third embodiment of a presentation managing information providing method according to the present invention.

FIG. 6 is the third embodiment of a presentation managing information providing method according to the present invention. When a TS for audio and video of a title or a program is recorded by a TS MUX 500 equipped in the HDVD manufacturing apparatus as shown in FIG. 6 to manufacture a HDVD-ROM, if there is time interval in which audio and video data packets will not be delivered to a presentation apparatus and the time interval should be used as a time slot for a PSI packet to be sent, a pseudo PSI packet, whose packet ID is distinguished from those of video and audio packets, is inserted for the time interval to be recorded between data packets. This pseudo PSI packet has no data field besides information regarding time to send real PSI packet.

Therefore, the microcomputer 39 of the HDVD player 300 detects the pseudo PSI packet while reproducing the recorded program or title, then replaces the detected pseudo packet with a real PSI packet produced by the aforementioned method and applies the PSI packet to the TS MUX 38 on time specified in the time information written in the detected pseudo PSI packet, thereby providing the packetized presentation managing information such as the PSI between the TS packets containing video and audio without affecting the data packet delivering time.

To be brief, the microcomputer 39 produces the PSI packet and replaces the pseudo PSI packet with it whenever the "pseudo PSI packet is detected. Therefore, the digital television 200 receives intermittently PSI for the reproduced data stream so that it uses PSI to present video and audio variously and/or immediately.

Figure 7:
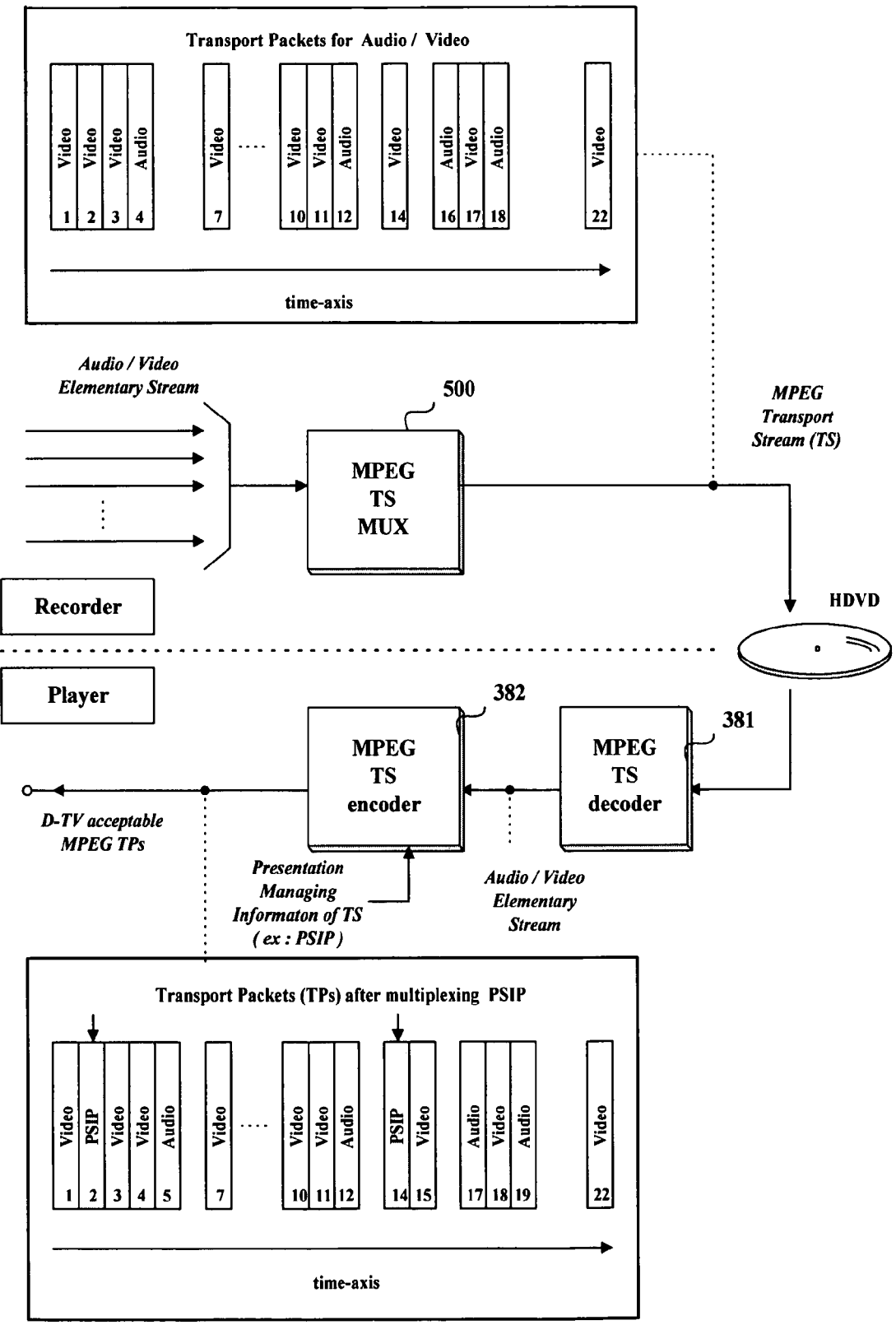
FIG. 7 is a fourth embodiment of a presentation managing information providing method according to the present invention.

FIG. 7 is the fourth embodiment of a presentation managing information providing method according to the present invention. For this embodiment, the TS MUX 38 of the HDVD player 300 shown in FIG. 2 is replaced with two elements of a TS decoder 381 and a TS encoder 382. The TS decoder 381 converts the reproduced audio and video data packets from the data parser 35 into a packetized elementary stream (PES) and the TS encoder 382 reconstructs the PES into transport packets as inserting the PSI packets between the audio and video data packets. In this embodiment, when a TS for audio and video of a title or a program is recorded by a TS MUX 500 equipped in the HDVD manufacturing apparatus as shown in FIG. 7 to manufacture a HDVD-ROM, no information indicating when to deliver the PSI packet is written. Therefore, the TS encoder 382 encodes the PSI packets produced periodically by the microcomputer 39 into transport packets together with the PES of audio and video data being inputted from the TS decoder 381, thereby inserting the packetized PSI between the audio and video data transport packets periodically.

Because the TS encoder 382 reconstructs the decoded PES into transport packets, the reconstructed packets may not be transmitted to the digital television 200 on time specified in the time information such as PTS or PCR contained in the original TS packets recorded on the HDVD. Therefore, the TS encoder 382 writes new time information adequate to present delivering time in the reconstructed packets.

Accordingly, the PSI for the data stream reproduced from the HDVD is periodically provided to the digital television 200, which means that the digital television 200 receives periodically PSI for the received data stream so that it uses PSI to present video and audio data variously and/or immediately.

The method for providing PSI of the reproduced digital data stream according to the present invention makes it unnecessary to record PSI repeatedly in the presentation data packs by producing PSI packets based on the information written in the navigation pack, thereby improving the recording efficiency of the high-density disk recording medium.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A method of generating a transport stream in an apparatus including a pickup, a controller and a transmitting part, the method comprising:
    reading, via the pickup, an MPEG transport stream directly from an optical disc, the MPEG transport stream including a series of transport packets;
    generating, via the controller, a program managing information packet for indicating a discontinuity of the MPEG transport stream in a form of a transport packet;
    inserting, via the controller, the generated program managing information packet between two of the transport packets existing in the read MPEG transport stream when a discontinuity occurs in the MPEG transport stream; and
    transferring, via the transmitting part, the MPEG transport stream including the inserted program managing information packet through a digital interface.

2. The method of claim 1, wherein the MPEG transport stream is an MPEG-2 transport stream.

3. The method of claim 1, wherein the apparatus comprises an optical disc player, and the inserting step is performed by the optical disc player.

4. The method of claim 3, wherein the reading step is performed by the optical disc player.

5. A method of reproducing data from an optical disc in an apparatus including a pickup, a controller and a transmitting part, the method comprising:

reading, via the pickup, an MPEG transport stream including a series of transport packets carrying data directly from the optical disc, said MPEG transport stream to be transmitted through a digital interface;

generating, via the controller, a program managing information packet for indicating a discontinuity of the MPEG transport stream in a form of a transport packet;

inserting, via the controller, the generated program managing information packet between two of the transport packets existing in the read MPEG transport stream when a discontinuity occurs in the MPEG transport stream; and transmitting, via the transmitting part, the MPEG transport stream having the program managing information packet inserted therein through the digital interface.

6. The method of claim 5, wherein the apparatus comprises an optical disc player, and the inserting step is performed by the optical disc player.

7. The method of claim 6, wherein the reading step is performed by the optical disc player.

8. An apparatus for generating a transport stream, the apparatus comprising:
a pickup configured to read an MPEG transport stream directly from an optical disc, the MPEG transport stream including a series of transport packets carrying data and to be transferred through a digital interface;
a controller configured to generate a program managing information packet for indicating a discontinuity of the MPEG transport stream, and to insert the program managing information packet between two of the transport packets existing in the read MPEG transport stream when a discontinuity occurs in the MPEG transport stream; and
a transmitting part configured to transmit the MPEG transport stream having the program managing information packet inserted therein through the digital interface.

9. The apparatus of claim 8, wherein the MPEG transport stream is an MPEG-2 transport stream.

10. The apparatus of claim 8, wherein the apparatus is an optical disc player.

11. An apparatus for reproducing data from an optical disc, the apparatus comprising:
a pickup configured to read an MPEG transport stream including a series of transport packets carrying data directly from the optical disc, said MPEG transport stream to be transmitted through a digital interface;
a controller configured to generate the program managing information packet in the form of a transport packet, and to insert the program managing information packet between two of the transport packets existing in the read MPEG transport stream when a discontinuity occurs in the MPEG transport stream; and
a transmitting part configured to transmit the MPEG transport stream having the program managing information packet inserted therein through the digital interface.

12. An apparatus for generating a transport stream, the apparatus comprising:
means for reading an MPEG transport stream directly from an optical disc, the MPEG transport stream including a series of transport packets carrying data, the MPEG transport stream to be transferred through a digital interface;
means for generating a program managing information packet indicating a discontinuity of the MPEG transport stream in a form of a transport packet;
means for inserting the generated program managing information between two of the transport packets existing in the read MPEG transport stream when a discontinuity occurs in the MPEG transport stream; and
means for transmitting the MPEG transport stream including the inserted program managing information through the digital interface.

13. An apparatus for generating a transport stream, the apparatus comprising:
means for recording an MPEG transport stream including a series of transport packets carrying data directly on an optical disc such that the MPEG transport stream can be read directly from the optical disc, said MPEG transport stream to be transmitted through a digital interface;
means for reading the recorded MPEG transport stream from the optical disc;
means for generating a program managing information packet indicating a discontinuity of the MPEG transport stream in a form of a transport packet;
means for inserting the program managing information packet between two of the transport packets existing in the read MPEG transport stream when a discontinuity occurs in the MPEG transport stream; and
means for transmitting the MPEG transport stream having the program managing information packet inserted therein through the digital interface.

14. The method of claim 1, further comprising:
detecting a null time interval in the MPEG transport stream, said null time interval corresponding to said discontinuity,
wherein the inserting step inserts the program managing information packet into the detected null time interval.

15. The method of claim 5, further comprising:
detecting a null time interval in the MPEG transport stream, said null time interval corresponding to said discontinuity,
wherein the inserting step inserts the program managing information packet into the detected null time interval.

16. The apparatus of claim 8, further comprising:
a detecting part configured to detect a null time interval in the MPEG transport stream, said null time interval corresponding to said discontinuity,
wherein the controller is further configured to insert the program managing information packet into the detected null time interval.

17. The apparatus of claim 11, further comprising:
a detecting part configured to detect a null time interval in the MPEG transport stream, said null time interval corresponding to said discontinuity,
wherein the controller is further configured to insert the program managing information packet into the detected null time interval.

18. The apparatus of claim 12, further comprising:
means for detecting a null time interval in the MPEG transport stream, said null time interval corresponding to said discontinuity,
wherein the means for inserting inserts the program managing information packet into the detected null time interval.

19. The apparatus of claim 13, further comprising:
means for detecting a null time interval in the MPEG transport stream, said null time interval corresponding to said discontinuity,
wherein the means for inserting inserts the program managing information packet into the detected null time interval.

* * * * *